United States Patent [19]

Bachmann

[11] 4,022,080

[45] May 10, 1977

[54] TRANSCRIPTION MECHANISM FOR TAPE PLAYER

[76] Inventor: Mario E. Bachmann, 2 E. Oak St., Chicago, Ill. 60611

[22] Filed: Aug. 29, 1975

[21] Appl. No.: 608,965

[52] U.S. Cl. .............................. 74/481; 74/483 PB; 74/501 R; 242/201; 360/74; 179/100.1 DR

[51] Int. Cl.² ................... G05G 11/00; G05G 1/14

[58] Field of Search .............. 74/481, 483 PB, 512, 74/501 R; 242/201, 202; 360/71, 74; 179/100.1 DR

[56] References Cited

UNITED STATES PATENTS

| | | | |
|---|---|---|---|
| 2,664,251 | 12/1953 | Berlant | 242/202 |
| 3,316,773 | 5/1967 | Findlay | 74/481 |
| 3,813,691 | 5/1974 | Emmert | 360/74 |
| 3,847,872 | 8/1958 | Todd | 74/481 X |
| 3,911,482 | 10/1975 | Kolb et al. | 179/100.1 DR |

*Primary Examiner*—Allan D. Herrmann
*Attorney, Agent, or Firm*—Dressler, Goldsmith, Clement, Gordon & Shore, Ltd.

[57] ABSTRACT

A transcription mechanism for use with tape players of the type having control members movable between neutral and operative positions, the mechanism including a controller positionable in operative relationship with the control members, a remote foot pedal and a cable interconnecting the controller and the foot pedal.

22 Claims, 12 Drawing Figures

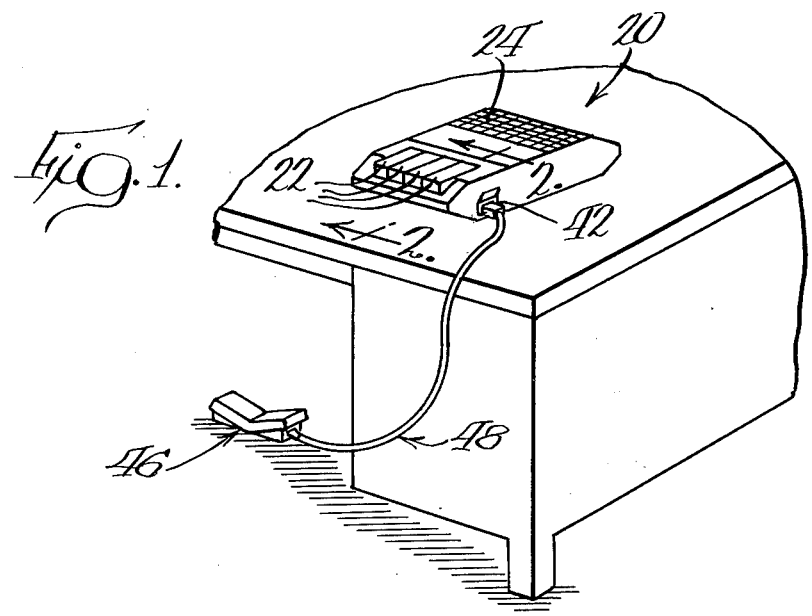
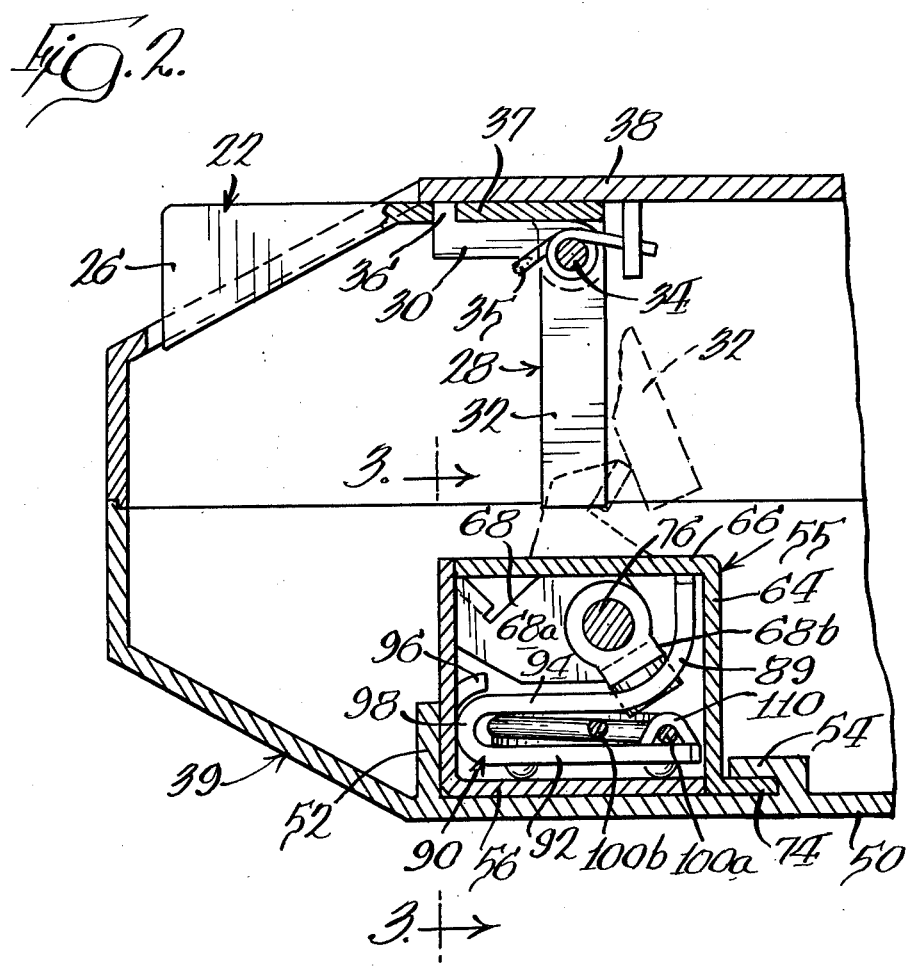

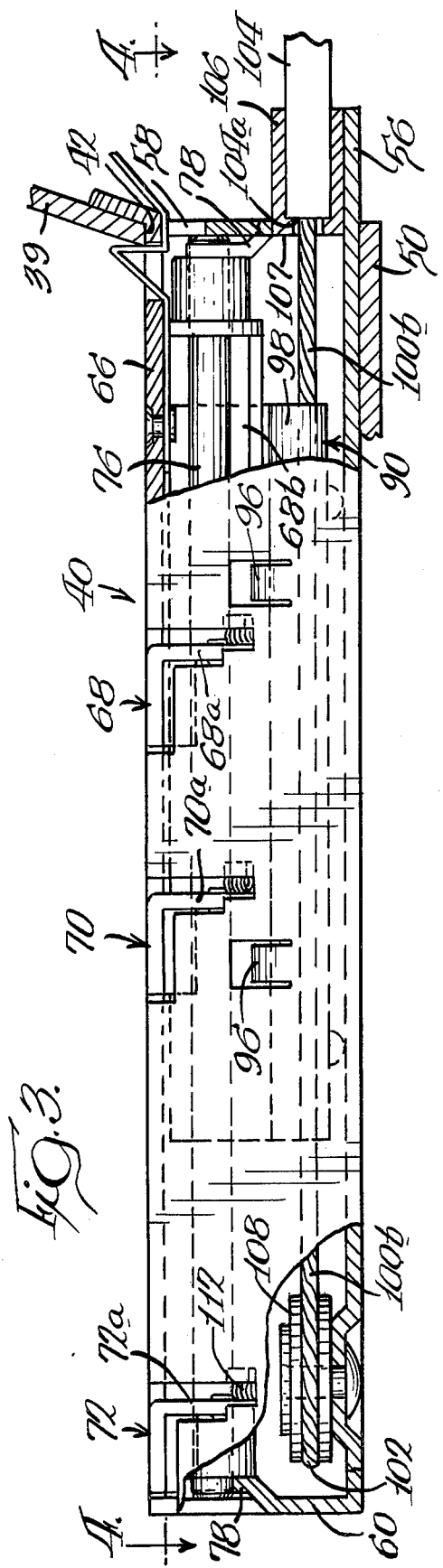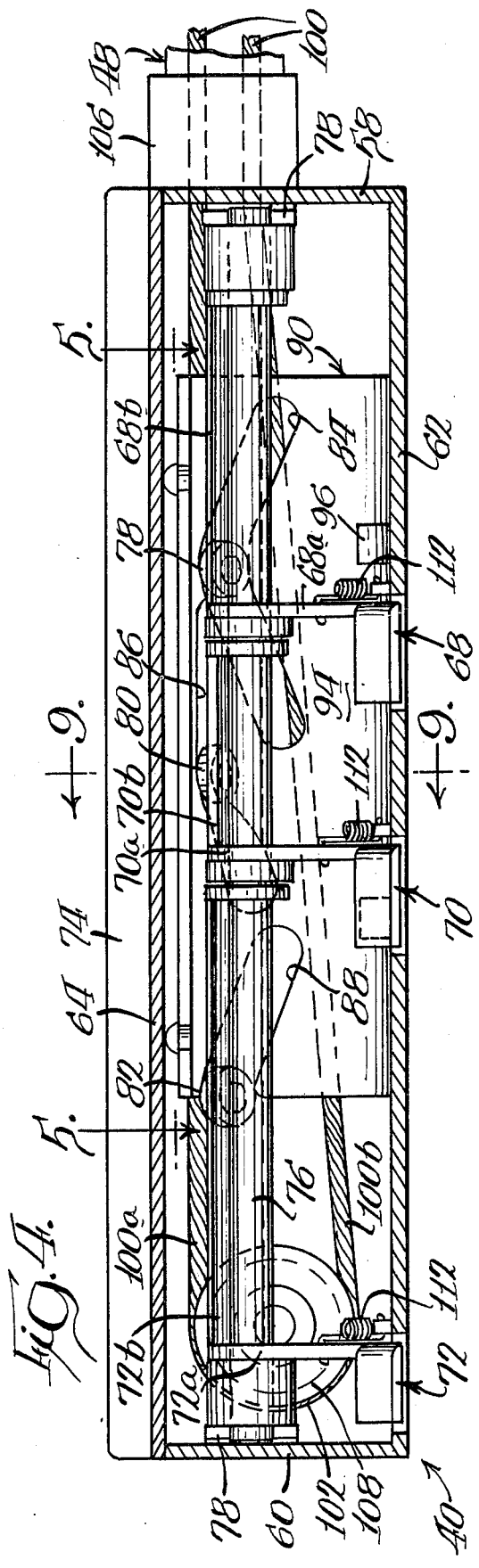

STOP  PLAY  REWIND

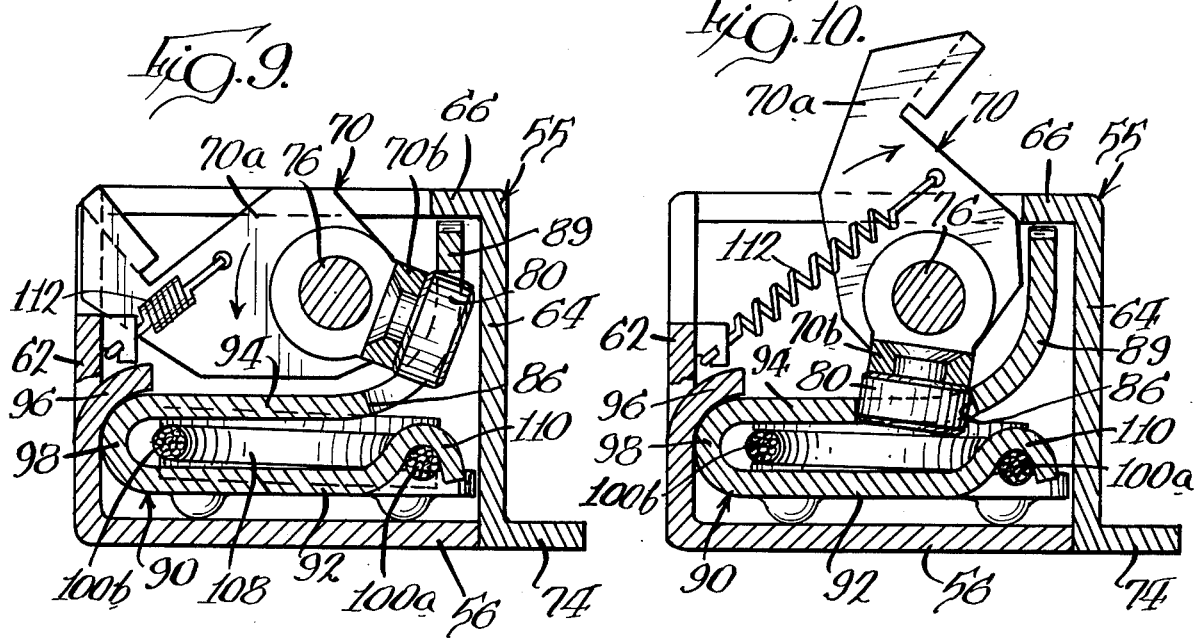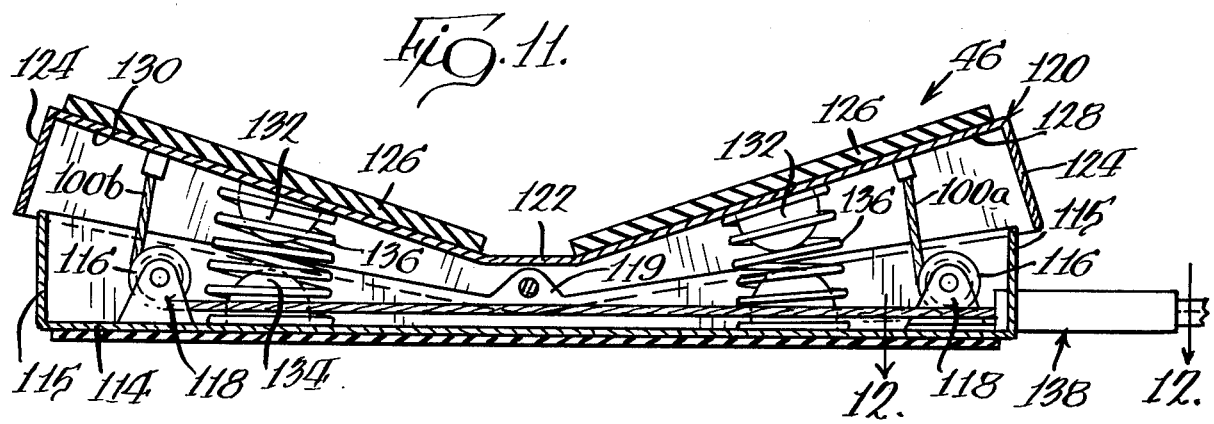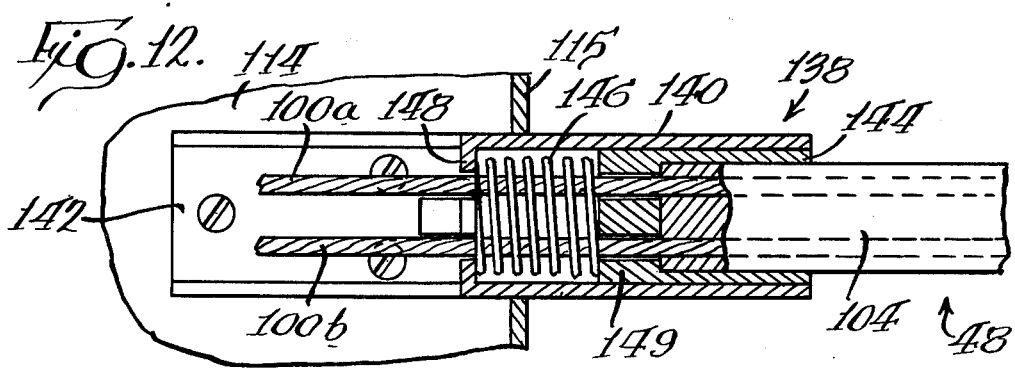

TRANSCRIPTION MECHANISM FOR TAPE PLAYER

BACKGROUND OF THE INVENTION

This invention relates to transcription mechanisms for use with tape players and in particular for use with portable cassette magnetic players.

A wide variety of tape players have been produced for use with magnetic tape cassettes, which are well known. Such tape players, which often have recording capabilities as well, take many forms, some of which are quite costly, e.g., high fidelity machines and equipment designed for office dictation, and many of which are relatively inexpensive, e.g., various forms of portable players. While cassette players are conceptually useable for dictation and transcription, only those machines designed for the jobs of dictation and transcription have been conveniently useable for that purpose. This is particularly true for transcription.

In transcription, it is particularly desirable to be able to control the movement of the tape incrementally, and to be able to do so without manipulating hand operated controls. Usually, a foot pedal of some type is connected to the apparatus and operation of the foot pedal selectively advances, rewinds and stops the tape. This allows the person transcribing the tape to listen to a small portion, to transcribe it onto paper, and to back-up or rewind the tape.

The very expensive high fidelity type of recorders are, of course, not designed with this capability in mind and it is unusual for such machines to be utilized for this purpose. Similarly, the inexpensive portable cassette tape players are also not designed with this capability. Such players, typically, are provided with a series of push button controls for operating the machine. Operation of the control button governs selection of the various operating modes of the player, i.e., rewind or reverse, fast forward, playback, and record. The control button includes a push button and a mechanical linkage connected to the push button. Depression of the push button effects operation of the player in a desired mode. In addition, the control button mechanism itself usually incorporates a locking mechanism to retain each control button in its depressed or actuated position. A stop or release button control is depressed to release the mechanical lock allowing the actuated function control buttons to return to idle or rest position.

It can be appreciated, that portable type cassette recorders of this configuration do not lend themselves readily to dictation and certainly are most difficult to utilize if it is desired to transcribe material recorded on the cassette tape, although on many occasions it would be desirable to utilize such inexpensive type tape players for transcription.

SUMMARY OF THE INVENTION

In accordance with the present invention there is provided a transcription mechanism adapted for use with at least inexpensive portable cassette type tape recorders. A mechanism in accordance with the present invention requires little, if any, modification to the mechansim of the player with which it is used, the minimal modifications to the recorder case.

A transcription mechanism in accordance with the present invention is adaptable for use with a wide variety of such players and does not require any electrical or electronic connections or modifications. It is simple, easy to install and reliable in operation.

Such a transcription mechanism takes advantage of the mechanical linkage connected to and forming part of the push button controls normally found on such players. It is designed to operate on these linkages in the same way as does depression of the control buttons directly to effect operation of the recorder in the play or rewind operating modes in response to operation of a foot pedal or other remotely located operator forming a part of the transcription mechanism.

More specifically, the transcription mechanism of the present invention is a mechanical cable operated device having a controller portion for insertion into the case of the tape player adjacent to and in operative relationship to the control button linkages. In operation, the controller is connected by a longitudinally movable cable to a foot pedal and is normally biased to a neutral position. Operation of the foot pedal selectively operates an actuator control in the form of a camming member connected to the cable to selectively actuate a plurality of actuators to engage corresponding linkages for causing the player to operate in either its play mode or rewind mode.

Since movement of the linkages energizes the electronics of the recorder in the usual manner, no new electrical circuits or electrical modifications are required. The controller effects an automatic release of the locking function and, therefore, release of the foot pedal results in return of the actuators to their neutral or idle position in response to biasing means forming part of the controller and the foot pedal, and because of the normal biasing of the recorder linkages.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

BRIEF DESCRIPTION OF THE DRAWING

FIG. 1 is a perspective view of a typical portable cassette recorder showing the transcription mechanism of the present invention connected thereto;

FIG. 2 is a sectional view taken along lines 2—2 of FIG. 1;

FIG. 3 is an elevational view of the controller forming part of the present invention with a portion broken away for clarity;

FIG. 4 is a plan sectional view of the controller taken along lines 4—4 of FIG. 3;

FIG. 9 is a sectional view taken along line 9—9 of FIG. 4;

FIG. 10 is a sectional view similar to FIG. 9 showing components of the controller in an actuated position;

FIG. 11 is a cross-sectional view of a foot pedal for use with the present invention; and FIG. 12 is a sectional view taken along lines 12—12 of FIG. 11.

DESCRIPTION OF PREFERRED EMBODIMENT

Figure 5:
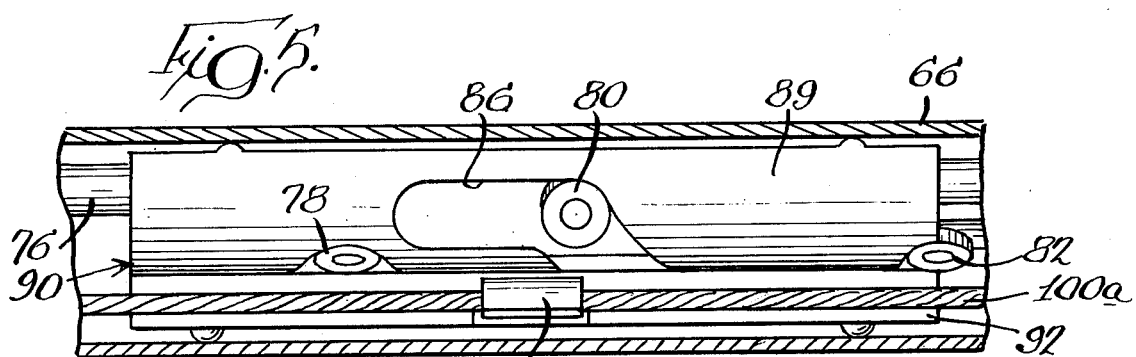
FIG. 5 is a partial plan sectional view of the controller taken along lines 5—5 of FIG. 4.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out to the appended claims.

A typical portable cassette tape player 20 is shown in FIG. 1, and usually has at least four control buttons 22, e.g., a rewind button, a fast forward button, a play button and a stop or release button. Some embodiment of such tape players have a fifth or record button (not shown). Alternatively, this function may be operated by another control located elsewhere on the player.

A cassette (not shown) of the usual type is inserted into the player 20 under the usual flip-open cover 24. The mechanical and electrical details of such portable cassette players are well known and do not form a part of the present invention.

As seen in FIG. 2, each of the control buttons 22 comprises a push button 26 connected to some type of mechanical linkage such as an L-shaped bell crank 28 having a first or horizontal leg 30 and a second or vertical leg 32. The bell crank 28 is pivotally mounted on a pivot shaft 34 intermediate the ends thereof and is biased to an idle or neutral position by spring 35. The horizontal leg 30 of bell crank 28 terminates in an upwardly extending projection 36 affixed to a push button extension 37 which lies along the top edge of the bell crank horizontal leg 30 and abuts the top wall 38 of player case 39.

When a push button 26 is depressed, the bell crank 28 is pivoted in a counterclockwise direction as shown in FIG. 2 into the position shown in dotted lines and engages a suitable operating component (not shown) of the tape player 20 to operate the player in the selected mode. While one configuration of a control button 22, having push button 26 and bell crank 28 is shown in the drawing, it is readily understood that various configurations having substantially the same mode of operation are found in the variety of existing players.

A transcription mechansim in accordance with the present invention includes a controller 40 adapted to be placed into an operative relationship with the control buttons 22 by insertion into player 20 through an aperture 42 formed in the side of the player case 39, a foot pedal 46 for operating the controller 40 and a mechanical cable link 48 between the foot pedal 46 and the controller 40.

As seen in FIGS. 1 and 2, the only modification required to be made to any existing player to accommodate the transcription mechanism of the present invention is the provision of aperture 42 and the addition of retaining member to the bottom wall 50 of the case 39 to properly orient and retain the controller 40 in place within the player. In FIG. 2, two retaining members are shown — an upwardly extending flange or rib 52 and an L-shaped flange 54.

The operative components of the controller 40 are encased into a housing 55 having a bottom wall 56, a pair of end walls 58, 60, a pair of sidewalls 62, 64 and a top wall 66, which is configured to allow passage therethrough of three actuating members 68, 70, 72. The controller 40 is inserted through the aperture 42 in the player case 39 and is held in position by the rib 52 abutting sidewall 62 and by flange 54 which slidably receives a tab 74 extending laterally out from sidewall 64.

A shaft 76 extends substantially the full length of the controller 40 and is supported at its opposite ends in suitable retaining means 78 formed from the respective end walls 58, 60. In the illustrated embodiment, the three actuators 68, 70, 72 are generally L-shaped. Each of the actuators has a first or actuating portion 68a, 70a, 72a extending transversely to the shaft 76 and pivotally supported thereon, and a second or camming portion 68b, 70b, 72b extending generally parallel to the shaft 76.

Cam followers 78, 80, 82 are each rotatably supported at the end of each of the camming portions 68b, 70b, 72b, respectively. Each of the cam followers 78, 80, 82 is slidably received in a corresponding cam slot 84, 86, 88 formed in an arcuate camming portion 89 of a control slide 90.

As seen in FIG. 2, the control slide 90 is generally U-shaped with the legs 92, 94 extending generally horizontally between the sidewalls 62, 64 of the housing 55. A detent 96 deformed inwardly from one of the sidewalls 62 extends over the base 98 of the U-shaped control slide 90 to retain the slide in position. Upper horizontal leg 94 of the control slide 90 terminates opposite the U-shaped base 98 in the arcuate camming portion 89.

The link 48 includes a bowden-like control cable 100 connecting the foot pedal 46 to the controller 40 to transmit longitudinal motion and thereby actuate the controller in response to operation of the foot pedal 46. The control cable 100 is folded back on itself to form a closed loop end 102. The two reaches 100a, 100b of control cable 100 are encased within a suitable sheath 104 which extends substantially the entire length of the control cable 100.

The closed, looped end 102 of control cable 100 is introduced into controller housing 55 through an opening in end wall 58 in which a retaining sleeve 106 is disposed. The retaining sleeve 106 retains the cable sheath 104 in position with the end 104a of the sheath 104 abutted against the substantially closed end 107 of the sleeve 106.

The closed or looped end 102 of control cable 100 is entrained around a pulley 108 rotatably affixed to the bottom wall 56 of the housing 55 adjacent end wall 60. A clamp 110 deformed from the bottom leg 92 of the control slide 90 connects the control slide to one reach 100a of the control cable 100 so that reciprocal longitudinal movement of the control cable 100 is transmitted to the control slide 90 to effect reciprocal sliding movement thereof within the controller housing 55. As explained below, this reciprocating movement of the control slide 90 selectively pivots the actuators 68, 70, 72 between an idle or neutral position and an actuated position.

Operation of the control slide 90 with respect to the actuators 68, 70, 72 is best understood by reference to FIGS. 6–10. While FIGS. 9 and 10 show only the play actuator 70 in its neutral and actuated positions, respectively, reciprocal movement of the control slide 90 results in the selective pivoting of all of the actuators 68, 70, 72 beween a neutral position such as is shown in FIG. 9 and an actuated position such as is shown in FIG. 10.

Figure 6:
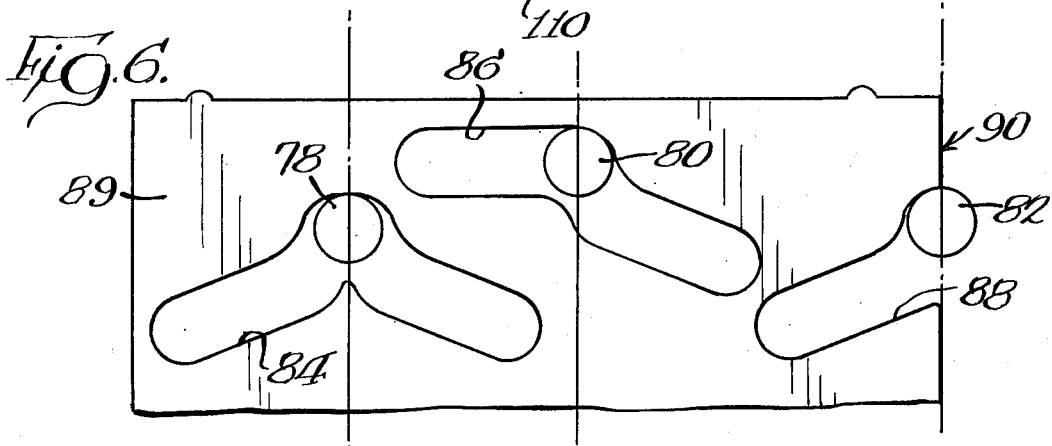
FIG. 6 is a projected view of a portion of the controller in the neutral position.
Figure 7:
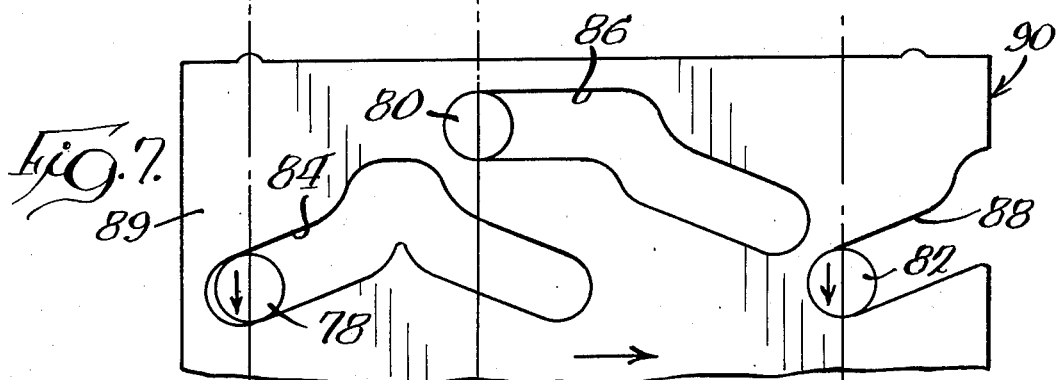
FIG. 7 is a view similar to FIG. 6 showing the controller in the rewind position.
Figure 8:
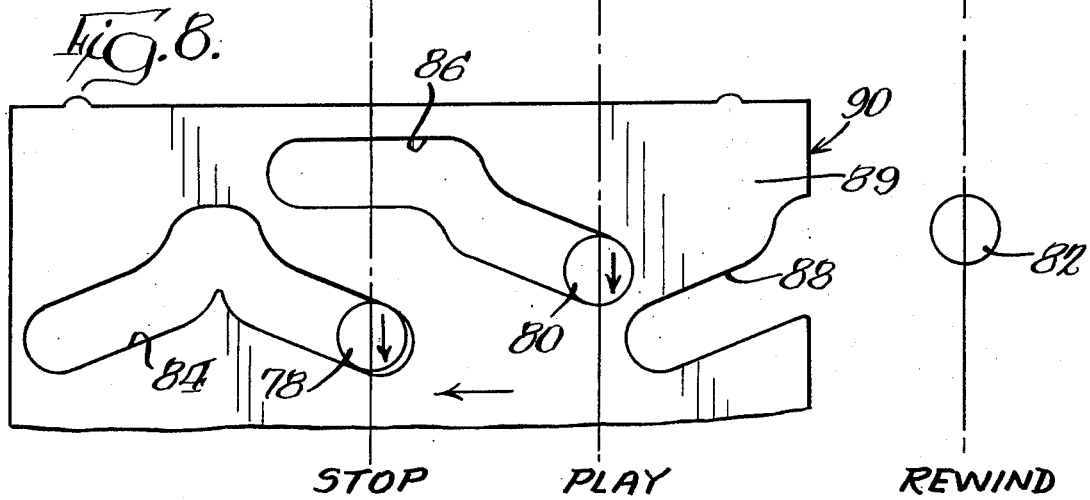
FIG. 8 is a view similar to FIG. 6 showing the porition of the controller in the play position.

In FIGS. 6, 7 and 8, the left, symmetrical cam slot 84 controls actuation of the release actuator 68, the center cam slot 86 controls actuation of the play actuator 70 and the right cam slot 88 controls actuator of the reverse of rewind actuator 72. In FIG. 6, the control slide 90 is shown in its center or neutral position in which all of the cam followers 78, 80, 82 are in their uppermost position and, therefore, all of the actuators 68, 70, 72 are in their neutral or idle position.

When the control slide 90 is shifted to the right, as seen in FIG. 7, to the rewind position, both the release cam follower 78 and the rewind cam follower 82 are shifted downwardly to pivot the release and rewind actuators 68, 72 from their idle or neutral positions (FIG. 9) to their actuated positions (FIG. 10). The play actuator 70 remains in its idle position since the play cam slot 86 extends generally horizontally to the left as shown.

When the control slide 90 is shifted to the left, as shown in FIG. 8, the release and play cam followers 78, 80 are shifted downwardly as shown in the drawing to pivot the release and play actuators 68, 70 from their idle or neutral positions (FIG. 9) to their actuated positions (FIG. 10). In this case, the rewind actuator is not pivoted and is retained in its idle position by a biasing spring 112 connected to each of the actuators 68, 70, 72 (see FIGS. 9 and 10).

As explained above, when each actuator 68, 70, 72 is pivoted to its actuated position, it engages the vertical leg 32 of a corresponding bell crank 28 to move it into an operative position to effectuate the operation of the player in the same way as would occur upon depression of the corresponding push button 26. The release actuator 68 is operated in both play and reverse to allow the bell cranks 28 to return to their neutral position when the control slide 90 returns to its neutral position. Since reciprocal movement of the control slide 90 is controlled by the foot pedal 46, operation of the tape player in the play or reverse modes is controlled by the foot pedal 46 and release of the foot pedal returns the slide 90, the actuators 68, 70, or 68, 72 and the control buttons 22 to their neutral positions.

The foot pedal 46 includes a generally planar base 114 having an upwardly extending sidewall 115 extending around the periphery thereof. A pair of pulleys 116 are pivotally supported on pulley supported brackets 118 which are mounted on the foot pedal base 114. A central pivot bracket 119 is also provided which pivotally supports the cover or pedal member 120 which is shown as generally V-shaped in cross-section with the apex 122 of the V pivotally connected to the central pivot bracket 119. The pedal member 120 terminates in a depending sidewall 124 which ovelaps the sidewall 115 of the foot pedal base 114. Suitable foot pedal 126 can be affixed to each inclined portion 128, 130 of the cover or pedal member 120.

The pedal member 120 and base member 114 are each formed with a pair of projections 132, 134 adapted to pass adjacent each other and receiving and retaining a pair of coil springs 136 which are operative to return the pedal member 120 to its neutral or center position.

The ends of control cable 100 are introduced into the foot pedal 46 through a cable housing 138 slidably received within the sidewall 115 of the pedal base 114. The cable housing 138 includes first sleeve 140 having an extension 142 which, as shown in FIG. 12, is affixed to the base 114 to retain the housing 138 in position. A second sleeve 144 receives the cable sheath 104 and is slidably received within the first sleeve 140. A spring 146 disposed between the end walls 148, 149 of the sleeves 140, 144 maintains desired tension on the cable 100. One reach 100a of the control cable 100 passes around the first pulley 116 and is affixed to the inclined portion 118 of pedal 120. The end of the other reach 100b of control cable 100 extends across the length of the pedal base 114, passes around the second pulley 116 and is suitably affixed to the other inclined portion 130 of the pedal 120. It can be readily observed, that as either side 128, 130 of the pedal 120 is depressed, the cable is shifted longitudinally, one reach of the cable 100 being pulled into the foot pedal 46 and the other reach of cable 100 being pulled out of the foot pedal. Since the cable 100 is attached to the control slide, this reciprocal longitudinal movement of the cable 100 causes the control slide 90 to reciprocate.

Thus in operation, depressing the opposite sides 128, 130 of the V-shaped foot pedal 120 reciprocates the control slide 90 within the controller housing 55 to either play or rewind the tape cassette. The reciprocal motion of the control slide 90 in either direction operates the release actuator 68 to release the control button locking mechanism. Removal of pressure applied to the foot pedal 46, therefore, returns the control slide 90 to its neutral center position as a result of the bias springs 112 connected to each actuator, the springs 35 operatively engaging the bell cranks 28, and the balancing springs 136 in the foot pedal 46.

It can be appreciated, that the placement of the controller 40 within the player 20 in no way interfers with normal operation of the player when the controller 40 is in the neutral position since the actuators 68, 70, 72 in the neutral position are totally contained within the controller housing 55. It is possible, therefore, to operate the player in the usual fashion, i.e., by depressing the control buttons 22, with the controller 40 positioned within the player 20.

There has been disclosed in accordance with the present invention a transcription mechanism for use with the inexpensive cassette type magnetic recorder/players which requires only minimal modifications to the recorder case, but which otherwise allows existing operating components of the player to be controlled by the transcription mechanism without modification. No electrical connections or modifications are required, and the transcription mechanism is reliable, simple and inexpensive, and does not interfere with normal operation of the recording and playback mechanisms.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A transcription mechanism for use with tape players of the type having a plurality of control members, each selectively movable between a neutral position and an operative position in which the tape player is operated in one of a plurality of possible operating modes corresponding to the selected control member, comprising:
   controller means adapted to be positioned in operative relationship with selected ones of said control members;

said controller means includng actuator means selectively actuatable to engage selected ones of said control members for effecting movement thereof into said operative position;

means located remotely from said controller and selectively operable between neutral and operative positions for effecting selective actuation of said actuator means; and means connecting said remote means to said controller means for effecting actuation of said actuator means in response to operation of said remote means.

2. A transcription mechanism as claimed in claim 1 including:

biasing means connected to said actuator means for normally maintaining said actuator means in a deactuated position and for returning said actuator means to said deactuated position in response to the return of said remote means to its neutral position;

the deactuated position of said actuator means permitting said control members forming a part of said player to be selectively moved independently of said transcription mechanism.

3. A transcription mechanism as claimed in claim 1 wherein:

said controller means includes a plurality of said actuator means each selectively actuatable to engage different ones of said control members for effecting movement thereof into their respective operative position; and actuator control means operatively connected to said plurality of actuator means and to said connecting means for actuating selected ones of said actuator means in response to operation of said remote means between its neutral and operative positions.

4. A transcription mechanism as claimed in claim 3 wherein:

said connecting means includes cable means reciprocably movable in response to operation of said remote means between its neutral position and its operating position for operating said actuator control means to selectively actuate selected ones of said actuator means.

5. A transcription mechanism as claimed in claim 3 wherein:

said actuator conrol means is reciprocably movable relative to said controller means for selectively actuating and deactuating selected ones of said actuator means.

6. A transcription mechanism as claimed in claim 5 wherein:

said connecting means includes cable means reciprocably movable in response to operation of said remote means between its neutral and operative positions for effecting said reciprocating movement of said actuator control means to selectively actuate and deactuate selected ones of said actuator means.

7. A transcription mechanism as claimed in claim 6 wherein:

said tape player includes a locking mechanism for locking each of said control members in its operative position and further includes at least three control members, a first control member for effecting operation of said player in a play mode, a second control member for effecting operation of said player in a rewind mode, and a third control member for releasing said locking mechanism to permit control members in said operative position to return to said neutral position;

said controller including play mode actuating means for engagement with said first one of said control members, rewind actuator means for engagement with said second one of said control members, and release actuator means for engagement with said third one of control members.

8. A transcription mechanism as claimed in claim 7 wherein:

said actuator control means is reciprocably movable between a neutral position wherein all of said actuator means are deactuated and either of two alternative actuating positions, a first actuating position for actuating said play mode and release actuator means, and a second actuating position for actuating said reverse mode and release actuator means.

9. A transcription mechanism as claimed in claim 8 including:

biasing means for normally maintaining said actuating means deactuated and for deactuating said actuating means when said remote means is not maintained in an operative position.

10. A transcription mechanism as claimed in claim 1 including:

biasing means connected to said actuator means for normally maintaining said actuator means in a deactuated position and for returning said actuator means to said deactuated position in response to the return of said remote means to its neutral position.

11. A transcription mechanism as claimed in claim 10 wherein:

said controller means includes a plurality of said actuator means each selectively actuatable to engage different ones of said control members for effecting movement thereof into their respective operative position; and actuator control means operatively connected to said plurality of actuator means and to said connecting means for actuating selected ones of said actuator means in response to operation of said remote means between its neutral and operative positions; and said connecting means includes means movable in response to operation of said remote means between its neutral position and its operating position for operating said actuator control means to selectively actuate selected ones of said actuator means.

12. A transcription mechanism as claimed in claim 11 wherein:

said tape player includes a locking mechanism for locking each of said control members in its operative position and further includes at least two control members, a first control member for effecting operation of said player in a play mode, and a second control member for effecting operation of said player in a rewind mode, and means for releasing said locking mechanism to permit control members in said operative position to return to said neutral position;

said controller including play mode actuating means for engagement with said first one of said control members, rewind actuator means for engagement with said second one of said control members, and means for operating said release means.

13. A transcription mechanism as claimed in claim 12 wherein:

said actuator control means is reciprocably movable between a neutral position wherein all of said actuator means are deactuated and either of two alternative actuating positions, a first actuating position for actuating said play mode and a second actuating position of actuating said reverse mode.

14. A transcription mechanism as claimed in claim 13 wherein:

said release means is operative in at least both of said actuating positions.

15. A transcription mechanism as claimed in claim 1 wherein:

said controller means includes a plurality of said actuator means selectively actuatable to engage different ones of said control members for effecting movement thereof into their respective operative position; and actuator control means operatively connected to said plurality of actuator means and to said connecting means for actuating selected ones of said actuator means in response to operation of said remote means between its neutral and operative positions; and said actuator control means is reciprocably movable relative to said controller means for selectively actuating and deactuating selected ones of said actuator means.

16. A transcription mechanism as claimed in claim 15 wherein:

said connecting means includes means responsive to operation of said remote means between its neutral and operative positions for effecting said reciprocating movement of said actuator control means to selectively actuate and deactuate selected ones of said actuator means.

17. A transcription mechanism for use with tape players of the type having control member means selectively movable between a neutral position and a plurality of operative positions in which the tape player is operated in one of a plurality of possible operating modes corresponding thereto, comprising:

controller means adapted to be positioned in operative relationship with said control member means;

said controller means including actuator means selectively actuatable to engage said control member means for effecting movement thereof into said operative positions;

means located remotely from said controller and selectively operable between neutral and operative positions for effecting selective actuation of said actuator means; and means connecting said remote means to said controller means for effecting actuation of said actuator means in response to operation of said remote means.

18. A transcription mechanism as claimed in claim 17 including:

biasing means connected to said actuator means for normally maintaining said actuator means in a deactuated position and for returning said actuator means to said deactuated position in response to the return of said remote means to its neutral position;

whereby said control member means forming a part of said player is returned to said neutral position.

19. A transcription mechanism as claimed in claim 17 wherein:

said controller means includes actuator control means operatively connected to said actuator means and to said connecting means for actuating said actuator means in response to operation of said remote means between its neutral and operative positions.

20. A transcription mechanism as claimed in claim 19 wherein:

said connecting means includes means movable in response to operation of said remote means between its neutral position and its operating position for operating said actuator control means to selectively actuate said actuator means.

21. A transcription mechanism as claimed in claim 20 wherein:

said actuator control means is reciprocably movable relative to said controller means for selectively actuating and deactuating said actuator means.

22. A transcription mechanism as claimed in claim 21 wherein:

said connecting means includes cable means reciprocably movable in response to operation of said remote means between its neutral and operative positions for effecting said reciprocating movement of said actuator control means to selectively actuate and deactuate selected ones of said actuator means.

* * * * *